United States Patent
Liu

(10) Patent No.: US 12,447,676 B1
(45) Date of Patent: Oct. 21, 2025

(54) EXTRUSION DEVICE FOR ENHANCING BONDING STRENGTH BETWEEN 3D PRINTING LAYERS

(71) Applicant: Chang Liu, Hefei (CN)

(72) Inventor: Chang Liu, Hefei (CN)

( * ) Notice: Subject to any disclaimer, the term of this patent is extended or adjusted under 35 U.S.C. 154(b) by 0 days.

(21) Appl. No.: 19/221,912

(22) Filed: May 29, 2025

(30) Foreign Application Priority Data

Apr. 30, 2025 (CN) .......................... 202510575556.1

(51) Int. Cl.
*B29C 64/209* (2017.01)
*B29C 64/241* (2017.01)
*B29C 64/268* (2017.01)
*B33Y 30/00* (2015.01)

(52) U.S. Cl.
CPC .......... *B29C 64/209* (2017.08); *B29C 64/241* (2017.08); *B29C 64/268* (2017.08); *B33Y 30/00* (2014.12)

(58) Field of Classification Search
CPC ... B29C 64/118; B29C 64/209; B29C 64/241; B29C 64/268; B33Y 30/00
See application file for complete search history.

(56) References Cited

U.S. PATENT DOCUMENTS

2015/0140147 A1\* 5/2015 Konstantinos ........ B29C 64/241
425/174
2017/0028633 A1\* 2/2017 Evans ..................... B29C 70/16

\* cited by examiner

*Primary Examiner* — Galen H Hauth
*Assistant Examiner* — Mohamed K Ahmed Ali
(74) *Attorney, Agent, or Firm* — Hemisphere Law, PLLC; Zhigang Ma

(57) ABSTRACT

An extrusion device for enhancing a bonding strength between 3D printing layers is provided, which includes: a multi-axis driving device, an extrusion unit, and a laser heating unit. The extrusion unit includes a base and an extruder. The base is disposed on the multi-axis driving device. The multi-axis driving device is configured to drive the extrusion unit to move. The laser heating unit includes an annular guide rail, a sliding seat, and a laser emitter. The laser emitter is disposed on the sliding seat, which is slidably disposed on the annular guide rail. The annular guide rail is disposed on a circumferential side of the extruder. The laser emitter is configured to rotate to continuously heat an area to be covered by a material extruded from the extruder.

8 Claims, 7 Drawing Sheets

EXTRUSION DEVICE FOR ENHANCING BONDING STRENGTH BETWEEN 3D PRINTING LAYERS

TECHNICAL FIELD

The present disclosure relates to the field of three-dimensional (3D) printing technologies, and particularly to an extrusion device for enhancing a bonding strength between 3D printing layers.

BACKGROUND 3D printing (3DP), also known as an additive manufacturing technology, is a method of manufacturing solid parts by cumulatively adding materials layer by layer based on three-dimensional computer-aided design (CAD) data. A material extrusion-based 3D printing technology can be used for multi-material, multi-color printing of plastics, food, or living cells.

Fused Deposition Modeling (FDM) is a first example of a material extrusion system. The FDM was developed in the early 1990s, which uses polymers as a main material. The FDM builds parts layer by layer from bottom to top by heating and extruding thermoplastic filaments. However, in the process of building the parts layer by layer, a lower material has cooled and solidified when an upper material is extruded, and a joint surface between the upper and lower layers has not been fully melted and mixed, resulting in a poorer connection strength, which affects a structural strength of a final product.

SUMMARY

The present disclosure provides an extrusion device for enhancing a bonding strength between 3D printing layers, aiming to solve the problem that a structural strength of a final product is influenced by a poorer melting effect caused by a temperature difference between materials of layers in a stacking process of the existing FDM method of building parts layer by layer.

In an embodiment, an extrusion device for enhancing a bonding strength between 3D printing layers is provided, which includes: a multi-axis driving device and an extrusion unit, where the extrusion unit includes a base and an extruder, the base is disposed on the multi-axis driving device, and the multi-axis driving device is configured to drive the extrusion unit to move; and a laser heating unit, where the laser heating unit includes an annular guide rail, a sliding seat, and a laser emitter; the laser emitter is disposed on the sliding seat, the sliding seat is configured to be slidable on the annular guide rail, and the annular guide rail is disposed on a circumferential side of the extruder; and a driving mechanism is disposed on the sliding seat, and the driving mechanism is configured to drive the laser emitter to rotate around the extruder; where the extrusion unit is configured to: calculate a rotation angle theta of the laser emitter based on a motion trajectory of the extruder, and the laser emitter is configured to rotate based on the rotation angle theta to thereby make laser emitted by the extruder continuously heat an area to be covered by a material extruded by the extruder.

In an embodiment, the base includes a connecting frame and a device plate, the connecting frame is a right-angle structure, an end of the connecting frame is connected to the multi-axis driving device, the device plate is disposed on an end of the connecting frame facing away from the multi-axis driving device, the extruder is disposed on the device plate, an extrusion head is disposed on the extruder, and the extrusion head is disposed below the device plate.

In an embodiment, the device plate is a circular structure, and the annular guide rail is disposed on a circumferential side of the device plate; and the annular guide rail is configured to, when the multi-axis driving device drives the extrusion unit to move, move synchronously with the extrusion unit.

In an embodiment, the sliding seat includes a bearing plate and a connecting rod, guide wheels are disposed on the bearing plate, the guide wheels are configured to roll along inner and outer walls of the annular guide rail, an end of the connecting rod is connected to the bearing plate, and the laser emitter is disposed on an end of the connecting rod facing away from the bearing plate.

In an embodiment, roller ring rails and a driven gear are disposed on the annular guide rail, the roller ring rails are disposed on the inner and outer walls of the annular guide rail, and the guide wheels are configured to move along the roller ring rails.

In an embodiment, the driving mechanism includes a driving motor and a driving gear disposed on a power output shaft of the driving motor, the driven gear is meshed with the driving gear, and the driving gear is configured to rotate to thereby drive the laser emitter to follow the motion trajectory of the extruder and thereby to deflect.

In an embodiment, a conductive slider is disposed on the connecting rod, and the conductive slider is configured to slide on a conductive slip ring disposed on the annular guide rail.

In an embodiment, the laser emitter is obliquely disposed at the end of the connecting rod facing away from the bearing plate.

In an embodiment, a cooling fan is disposed on the extrusion head and is configured to cool the extrusion head.

In an embodiment, the guide wheels are at least four in number; and when the guide wheels are four, the four guide wheels construct two groups of guide wheels, each group of the two groups of guide wheels consists of two guide wheels, and the two groups of guide wheels are respectively disposed on two sides of the annular guide rail, the two groups of guide wheels roll are respectively disposed on the inner and outer walls of the annular guide rail.

In an embodiment, the guide wheels are V-shaped wheels, the roller ring rails are V-shaped guide rails matched with the guide wheels, and the sliding seat is engaged with the annular guide rail through mutual cooperation of the guide wheels and the roller ring rails.

Compared with the existing technology, main beneficial effects of the extrusion device of the present disclosure are as follows.

According to the extrusion device for enhancing the bonding strength between the 3D printing layers provided by the present disclosure, a previous printing layer is preheated by the laser heating unit in a printing process; when the extrusion unit constructs a new printing layer, a laser focusing point of the laser heating unit is located on an advancing path of the extrusion head of the extruder, and the laser heating unit will preheat an area of the previous printing layer to be covered by the new printing layer, so that a fusion bonding effect between the new printing layer and the previous printing layer is optimal, and a structural strength of a final product is improved.

Figure 1:
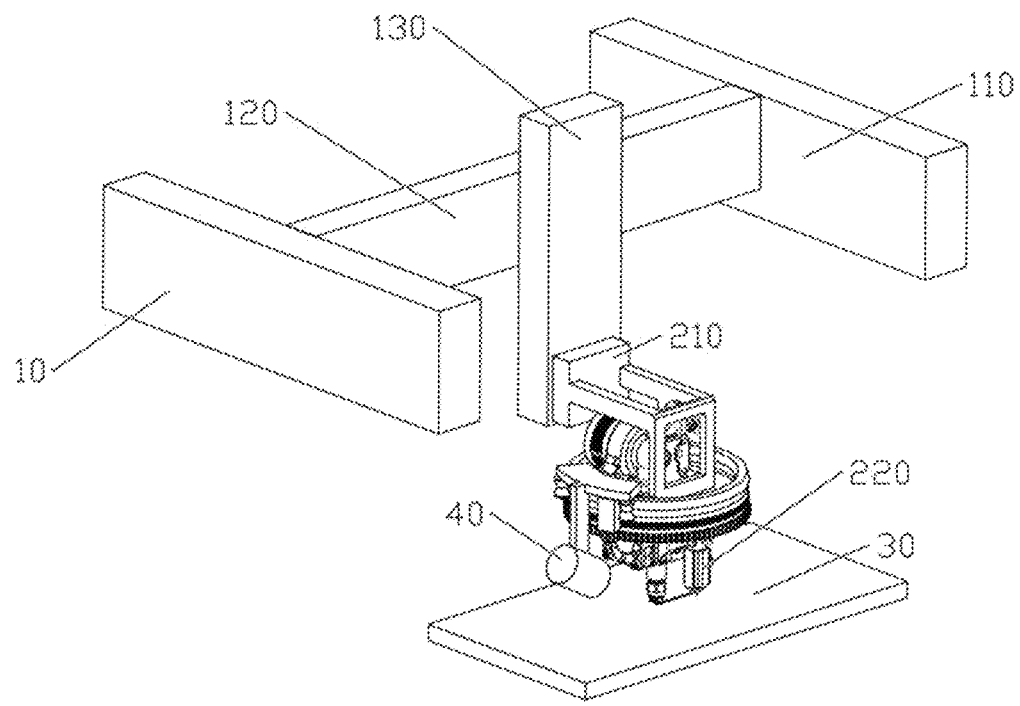
FIG. 1 illustrates a schematic structural diagram of an extrusion device for enhancing a bonding strength between 3D printing layers according to an embodiment of the present disclosure.
Figure 2:
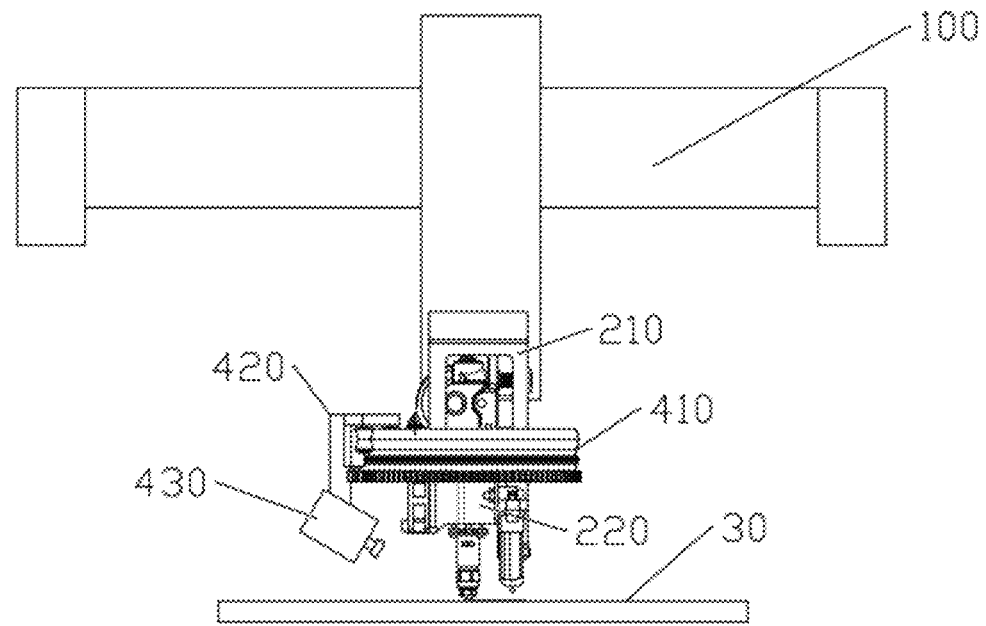
FIG. 2 illustrates a schematic front structural diagram of the extrusion device for enhancing the bonding strength between the 3D printing layers according to the embodiment of the present disclosure.
Figure 3:
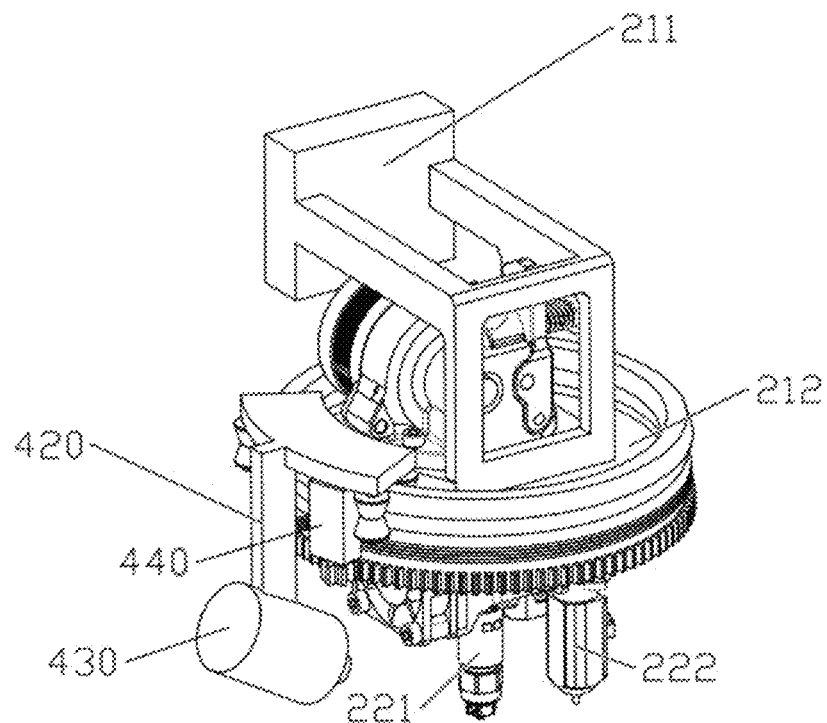
FIG. 3 illustrates a schematic structural diagram of an extrusion unit and a laser heating unit of the extrusion device for enhancing the bonding strength between the 3D printing layers according to the embodiment of the present disclosure.
Figure 4:
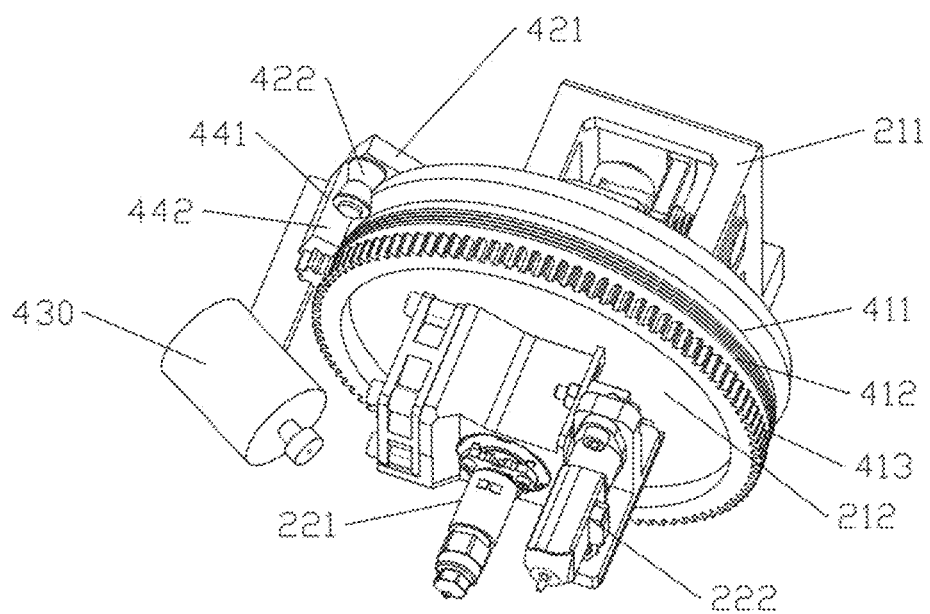
FIG. 4 illustrates a schematic structural diagram of a bottom of a device plate of the extrusion device for enhancing the bonding strength between the 3D printing layers according to the embodiment of the present disclosure.
Figure 5:
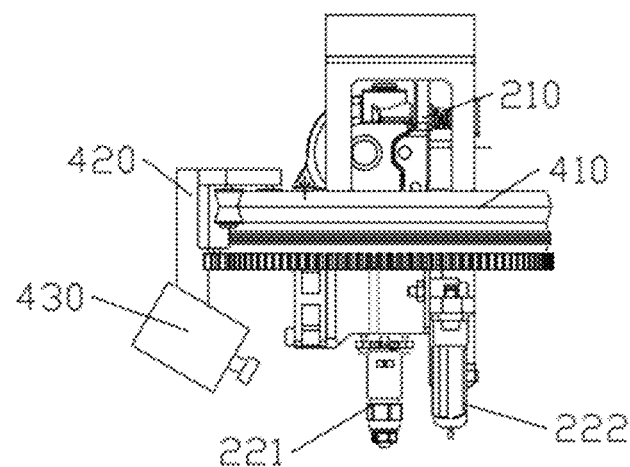
FIG. 5 illustrates a schematic front structural diagram of an extrusion unit of the extrusion device for enhancing the bonding strength between the 3D printing layers according to the embodiment of the present disclosure.
Figure 6:
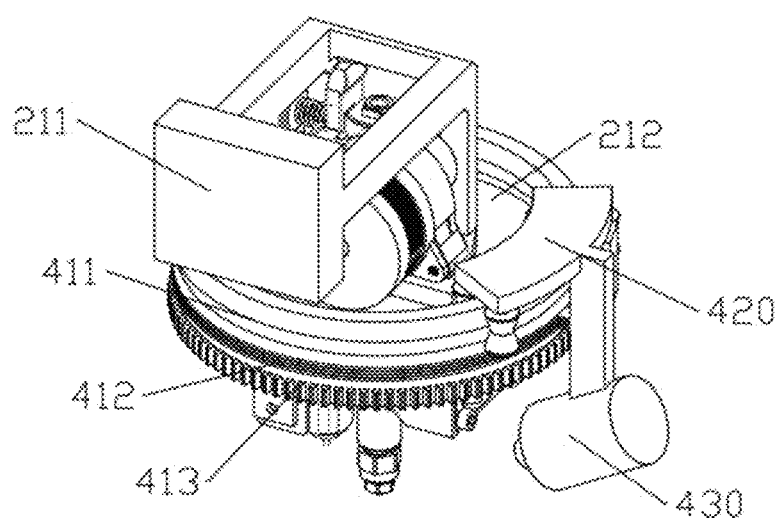
FIG. 6 illustrates a schematic structural diagram of an annular guide rail of the extrusion device for enhancing the bonding strength between the 3D printing layers according to the embodiment of the present disclosure.
Figure 7:
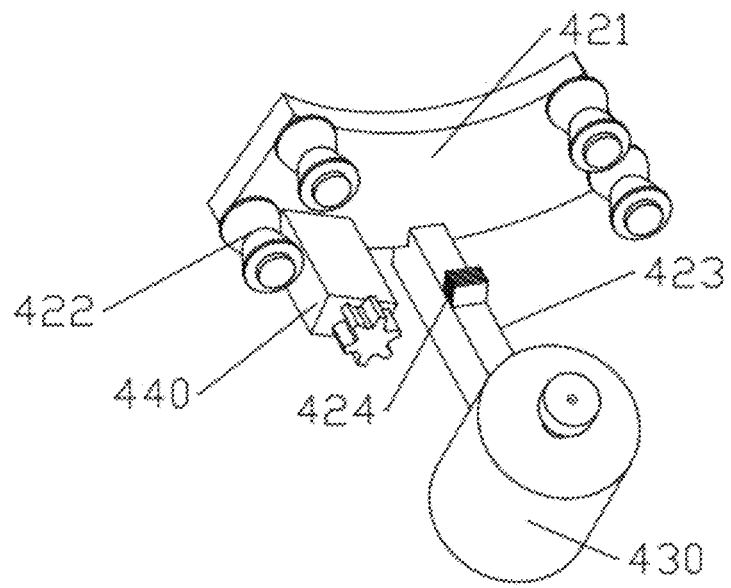
FIG. 7 illustrates a schematic structural diagram of a sliding seat of the extrusion device for enhancing the bonding strength between the 3D printing layers according to the embodiment of the present disclosure.

Reference numerals: 10: multi-axis driving device; 110: x-axis component; 120: y-axis component; 130: z-axis component; 20: extrusion unit; 210: base; 211: connecting frame; 212: device plate; 220: extruder; 221: extrusion head; 222: extrusion head corrector; 30: heated bed; 40: laser heating unit; 410: annular guide rail; 411: roller ring rail; 412: conductive slip ring; 413: driving gear; 420: sliding seat; 421: bearing plate; 422: guide wheel; 423: connecting rod; 424: conductive slider; 430: laser emitter; 440: driving mechanism; 441: driving motor; 442: driving gear; 511: dual-axis sliding seat; 512: y-axis rotary table; 513: x-axis rotary table; 521: U-shaped rotating seat; 522: transverse rotating table; 523: longitudinal rotary table.

DETAILED DESCRIPTION OF EMBODIMENTS

Unless otherwise defined, all technical and scientific terms used herein have the same meaning as commonly understood by those skilled in the technical field of this application. The terminology used in the specification of the application herein is only for the purpose of describing specific embodiments and is not intended to limit the application. The terms "including" and "having" in the specification and claims of the present disclosure and the description of the above drawings, as well as any variations thereof, are intended to cover non-exclusive inclusion. The terms "first" and "second" in the specification and claims of this application or the above drawings are used to distinguish different objects, not to describe a specific order.

Reference to "an embodiment" herein means that a particular feature, structure or characteristic described in connection with an embodiment can be included in at least one embodiment of the present disclosure. The appearance of this phrase in various places in the specification does not necessarily refer to the same embodiment, nor referring to an independent or alternative embodiment mutually exclusive with other embodiments. It is understood explicitly and implicitly by those skilled in the art that the embodiments described herein can be combined with other embodiments.

An embodiment of the present disclosure provides an extrusion device for enhancing a bonding strength between 3D printing layers, as shown in FIGS. 1 to 9. The extrusion device for enhancing the bonding strength between the 3D printing layers is applied to a heated bed 30 of a 3D printing device. The extrusion device for enhancing the bonding strength between the 3D printing layers includes a multi-axis driving device 10, an extrusion unit 20, and a laser heating unit 40. The multi-axis driving device 10 includes an x-axis component 110, a y-axis component 120, and a z-axis component 130. The y-axis component 120 is slidably disposed on the x-axis component 110. The z-axis component 130 is slidably disposed on the y-axis component 120. The extrusion unit 20 includes a base 210 and an extruder 220. The base 210 is slidably disposed on the z-axis component 130. The multi-axis driving device 10 here adopts a traction structure of an extruder in an existing 3D printer, so that the extruder can perform multi-axis movement to cover a whole 3D printing area. The lase heating unit 40 includes an annular guide rail 410, a sliding seat 420, and a laser emitter 430. The laser emitter 430 is disposed on the sliding seat 420. The sliding seat 420 is slidably disposed on the annular guide rail 410. The annular guide rail 410 is disposed on a circumferential side of the extruder 220. A driving mechanism 440 is disposed on the sliding seat 420, and the driving mechanism 440 is configured to drive the laser emitter 430 to rotate around the extruder 220.

The multi-axis driving device 10 is a printing head traction device in the existing 3D printer. The movement of the extrusion unit 20 in a 3D space is mainly realized by the x-axis component 110, the y-axis component 120 and the z-axis component 130. The structure of the multi-axis driving device 10 is briefly illustrated in this application, for details, please refer to the prior art structure. Motion principles adopted by the x-axis component 110, the y-axis component 120 and the z-axis component 130 here are mainly principles of an existing screw drive technology, which will not be described in detail here. Under the traction of the x-axis component 110, the y-axis component 120 and the z-axis component 130, the extrusion unit 20 moves above the heated bed 30 to generate a printing layer, and the extrusion unit 20 moves back and forth. As a result, a previously printed printing layer is a previous printing layer, a new printing layer will cover the previous printing layer, and due to the reciprocating motion of the extrusion unit 20, extruded thermoplastic polymer forms superimposed printing layers on the heated bed 30, and the superimposed printing layers finally form a specific printing structure.

The laser heating unit 40 is configured to preheat the previous printing layer during the printing process of the new printing layer by the extrusion unit 20. When the extrusion unit 20 builds the new printing layer, a laser focusing point of the laser heating unit 40 is located on an advancing path of an extrusion head of the extruder 220, and the laser heating unit will preheat an area of the previous printing layer to be covered by the new printing layer, so that a fusion bonding effect between the new printing layer and the previous printing layer is optimal, and a structural strength of a final product is improved.

A data trajectory analysis module is disposed on the extrusion device, and the data trajectory analysis module includes: a displacement sensor and a main controller disposed on the extruder 220, and a rotation speed controller disposed on the driving mechanism 440. The displacement sensor is configured to upload motion trajectory parameters formed by the extruder 220 during 3D printing to the main controller. The main controller is configured to calculate the rotation angle theta of the laser emitter 430 according to the motion trajectory of the extruder 220 and transmit the rotation angle theta of the laser emitter 430 to the rotation speed controller. The laser emitter 430 is configured to rotate correspondingly under that control of the rotation speed controller so that laser emit by the laser emitter 430 continuously heats an area to be covered by a material extruded by the extruder 220. A function of the main controller is to calculate a rotation angle theta of the laser emitter 430 based on a motion trajectory of the extruder 20, and the laser heating unit 40 ensures that the laser emitter 430 is located in a forward direction of the motion trajectory of the extrusion unit 20 through rotation, so that the laser emitter 430 can always preheat the area of the previous printing layer to be covered by the new printing layer. A rotation angle calculation program is stored in the main controller to complete the calculation operation.

The calculation method of the rotation angle theta is as follows: establishing a workpiece coordinate system O fixed relative to a workpiece, where an x-axis, a y-axis, and a z-axis form a right-hand triaxial coordinate system. Here, the motion trajectory (i.e., the trajectory of the extruder 220) of the extrusion unit 20 can be discretized into multiple line segments composed of line segments, and a time step is dt, which can be any value and can be determined according to a required accuracy. For a two-axis or three-axis mechanical structure (i.e., multi-axis driving device 10), it is assumed that, a center point of the extruder head is located at a point A at a moment of $t_i$, a position corresponding to the point A is ($x_i$, $y_i$, $z_i$), the extruder head moves to a point B at a moment of $t_{i+1}=t_i+dt$, and a position corresponding to the point B ($x_{i+1}$, $y_{i+1}$, $z_{i+1}$), then a rotation angle theta of the laser emitter 430 is $\delta$, which is calculated according to the following formulas:

when $x_{i+1}=x_i$, $y_{i+1}>y_i$, $\delta=90°$;
when $x_{i+1}=x_i$, $y_{i+1}<y_i$, $\delta=270°$;
when $y_{i+1}=y_i$, $x_{i+1}+>x_1$, $\delta=0°$;
when $y_{i+1}=y_i$, $x_{i+1}<x_i$, $\delta=180°$;
when $x_{i+1}>x_i$, $y_{i+1}>y_i$, $\delta=\arctan(|y_{i+1}-y_i|/|x_{i+1}-x_i|)$;
when $x_{i+1}<x_i$, $y_{i+1}>y_i$, $\delta=\arctan(|y_{i+1}-y_i|/|x_i-x_{i+1}|)+90°$;
when $x_{i+1}<x_i$, $y_{i+1}<y_i$, $\delta=\arctan(|y_{i+1}-y_i|/|x_{i+1}-x_i|)+180°$;
when $x_{i+1}>x_i$, $y_{i+1}<y_i$, $\delta=\arctan(|y_{i+1}-y_i|/|x_i-x_{i+1}|)+270°$.

Because the motion trajectory of the extruder 220 is a two-dimensional graph, a change value of $z_i$ does not change, and no special calculation is needed for $z_i$. The above formulas can also be applied to the multi-axis driving device 10 with a dual-axis drive system consisting of the x-axis component 110 and the y-axis component 120.

Figure 8:
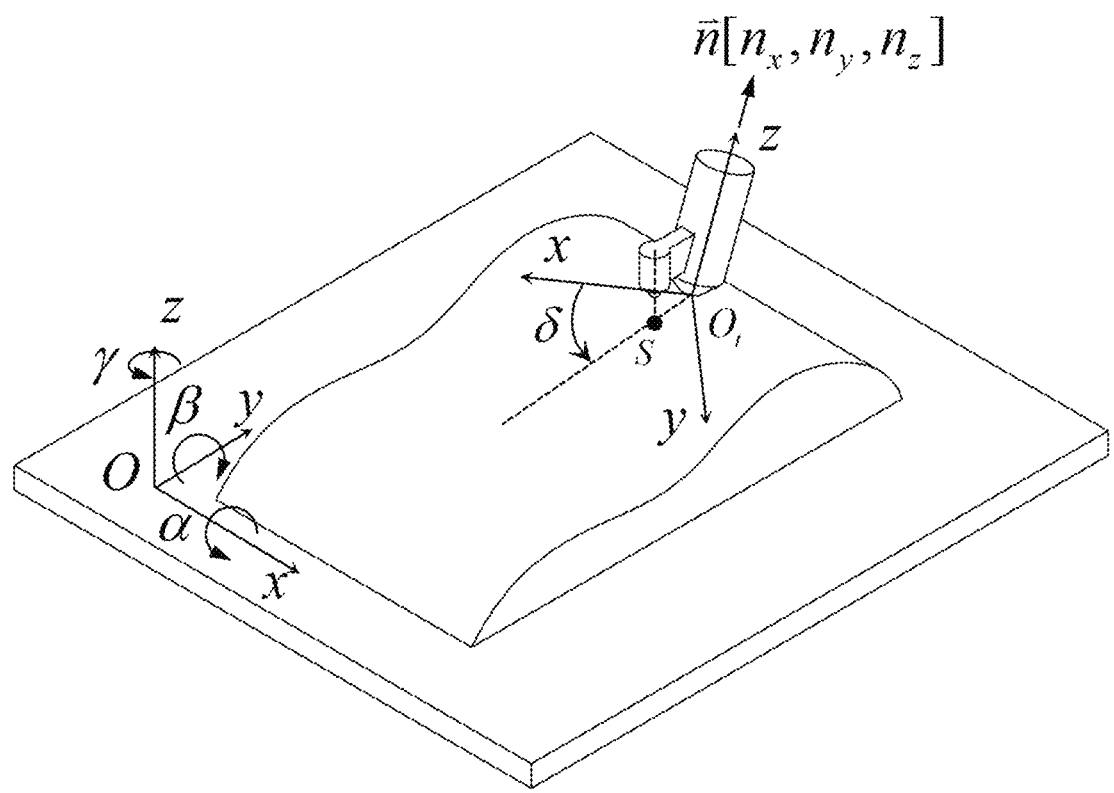
FIG. 8 illustrates a schematic diagram of a workpiece coordinate system O and an extrusion head coordinate system $O_t$ for the extrusion device for enhancing the bonding strength between the 3D printing layers according to the embodiment of the present disclosure.
Figure 9:
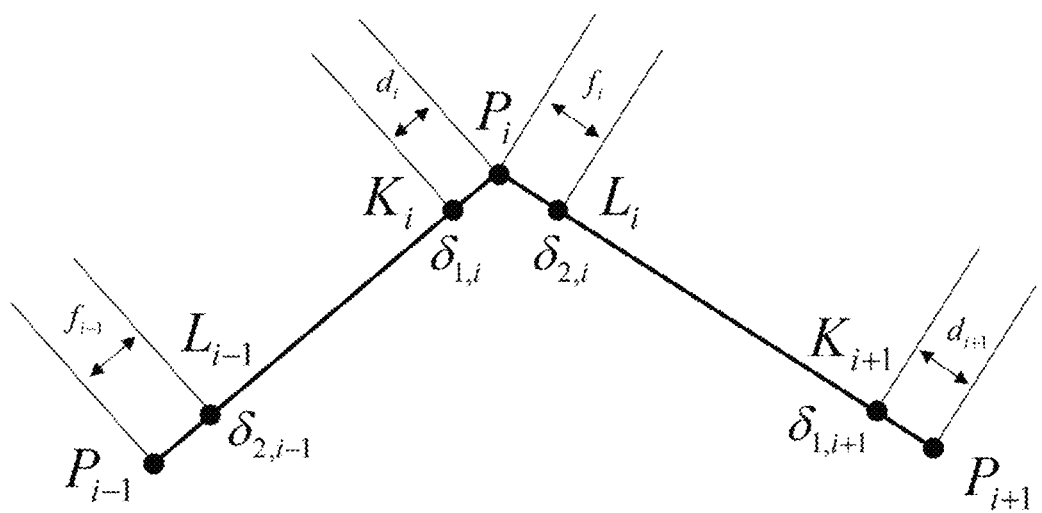
FIG. 9 illustrates a schematic diagram of a motion path under five-axis driving of the extrusion device for enhancing the bonding strength between the 3D printing layers according to the embodiment of the present disclosure.
Figure 10:
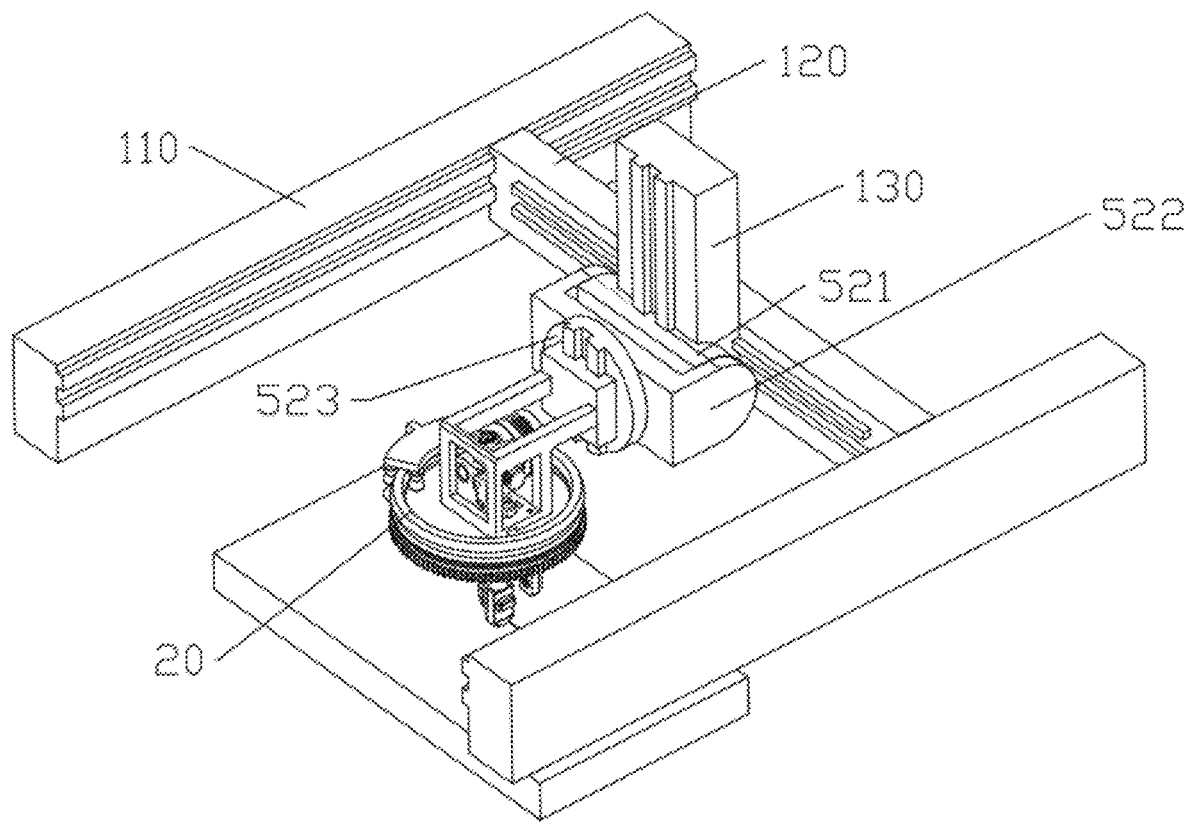
FIG. 10 illustrates a schematic structural diagram of a five-axis multi-axis driving device with rotation around an x-axis and a y-axis of the extrusion device for enhancing the bonding strength between the 3D printing layers according to the embodiment of the present disclosure.

As an implementation in this embodiment, as shown in FIGS. 8 to 10, a workpiece coordinate system O fixed relative to a workpiece is established for any motion path in a five-axis space, in which an x axis, a y axis, and a z axis constitute a right-hand three-axis coordinate system. The x-axis represents the rotation of the extruder head around the x-axis, with a rotation angle of $\alpha$; the y-axis represents the rotation of the extruder head around the y-axis, with a rotation angle of $\beta$; and the z-axis represents the rotation of the extruder head around the z-axis, with a rotation angle of $\gamma$.

Also, an extrusion head coordinate system $O_t$ fixed relative to the extrusion head is established at the center of the extrusion head. When the extruder head is at its zero position without any movement, the x-axis, the y-axis, and the z-axis of the extrusion head coordinate system $O_t$ and the x-axis, the y-axis, and the z-axis of the workpiece coordinate system O are completely parallel and in the same direction.

After the extruder head has undergone movement in the five-axis space, a direction of the z-axis of the extruder head coordinate system $O_t$ in the workpiece coordinate system O is $\vec{n}=[n_x, n_y, n_z]$, and the two coordinate systems are as shown in FIG. 8. The rotation angle of the laser emitter 430 is $\delta$, which means that a laser line intersects an xy plane of the extrusion head coordinate system O at a point S, and after a ray in a positive direction of the x-axis rotates $\delta$ counterclockwise around a point $O_t$, this ray coincides with a line segment $O_tS$, which is the rotation angle of a laser head of the laser emitter 430.

As shown in the FIG. 9, for any motion path in the five-axis space, two consecutive straight paths are taken, and for some arc or curve paths, the arc or curve paths are dispersed into straight paths by sampling points.

The origin $O_t$ of the extrusion head moves from a point $P_{i-1}$ to a point $P_i$ and then to a point $P_{i+1}$. In the workpiece coordinate system O, a coordinate of the point $P_i$ is ($x_i$, $y_i$, $z_i$). At the point $P_i$, a value of a z-axis normal vector of the extrusion head coordinate system $O_t$ in the workpiece coordinate system is $n_i=[nx_i, ny_i, nz_i]$.

Now, any straight-line path $P_i$ to $P_{i+1}$ is taken. At a moment $t_j$, in the workpiece coordinate system O, a coordinate of the extrusion head is $[x(t_j), y(t_j), z(t_j)]$, and the coordinate of the z-axis normal vector of the extrusion head is $\vec{n}(t_j)=[n_x(t_j), n_y(t_j), n_z(t_j)]$.

At a moment $t_{j+1}$, the coordinate of the extrusion head is $[x(t_{j+1}), y(t_{j+1}), z(t_{j+1})]$, and the coordinate of the z-axis normal vector of the extrusion head is $\vec{n}(t_{j+1})=[n_x(t_{j+1}), n_y(t_{j+1}), n_z(t_{j+1})]$, where $\Delta t=t_{j+1}-t_j$, which is determined by a control frequency f of the mechanical structure, that is, $\Delta t=1/f$.

Therefore, for any moment $t_j$ within a path segment from $P_i$ to $P_{i+1}$, the calculation method for the rotation angle $\delta(t_j)$ of the laser head is as follows: calculating an orientation of the extruder head coordinate system $O_t$ relative to the workpiece coordinate system O; calculating a coordinate of the extruder head at a moment $t_{j+1}$ in the extruder head coordinate system $O_t$ at moment $t_j$; calculating an angle between a line connecting $P(t_{j+1})$ and $P(t_j)$ and a positive direction of the x-axis in the extruder head coordinate system $O_t$ at the moment $t_j$.

The detailed calculation method for the rotation angle $\delta(t_j)$ of the laser head is as follows.

First, rotation matrices of the workpiece coordinate system are defined.

A rotation matrix corresponding to a rotation of $\alpha$ around the x-axis is defined as:

$$R_X(\alpha) = \begin{bmatrix} 1 & 0 & 0 \\ 0 & \cos\alpha & -\sin\alpha \\ 0 & \sin\alpha & \cos\alpha \end{bmatrix}$$

A rotation matrix corresponding to a rotation of $\beta$ around the y-axis is defined as:

$$R_Y(\beta) = \begin{bmatrix} \cos\beta & 0 & \sin\beta \\ 0 & 1 & 0 \\ -\sin\beta & 0 & \cos\beta \end{bmatrix}$$

A rotation matrix corresponding to a rotation of $\gamma$ around the z-axis is defined as:

$$R_Z(\gamma) = \begin{bmatrix} \cos\gamma & -\sin\gamma & 0 \\ \sin\gamma & \cos\gamma & 0 \\ 0 & 0 & 1 \end{bmatrix}$$

When $\alpha$ is positive, looking from infinity along the x-axis towards a yz-plane, the extruder head rotates counterclockwise around the x-axis. When $\beta$ is positive, looking from infinity along the y-axis towards an xz-plane, the extruder head rotates counterclockwise around the y-axis. When $\gamma$ is positive, looking from infinity along the z-axis towards an xy-plane, the extruder head rotates counterclockwise around the z-axis, as shown in FIG. 9.

A z-normal vector of the extruder head coordinate system $O_t$, when at a zero position, is [0,0,1] relative to the workpiece coordinate system O.

Figure 11:
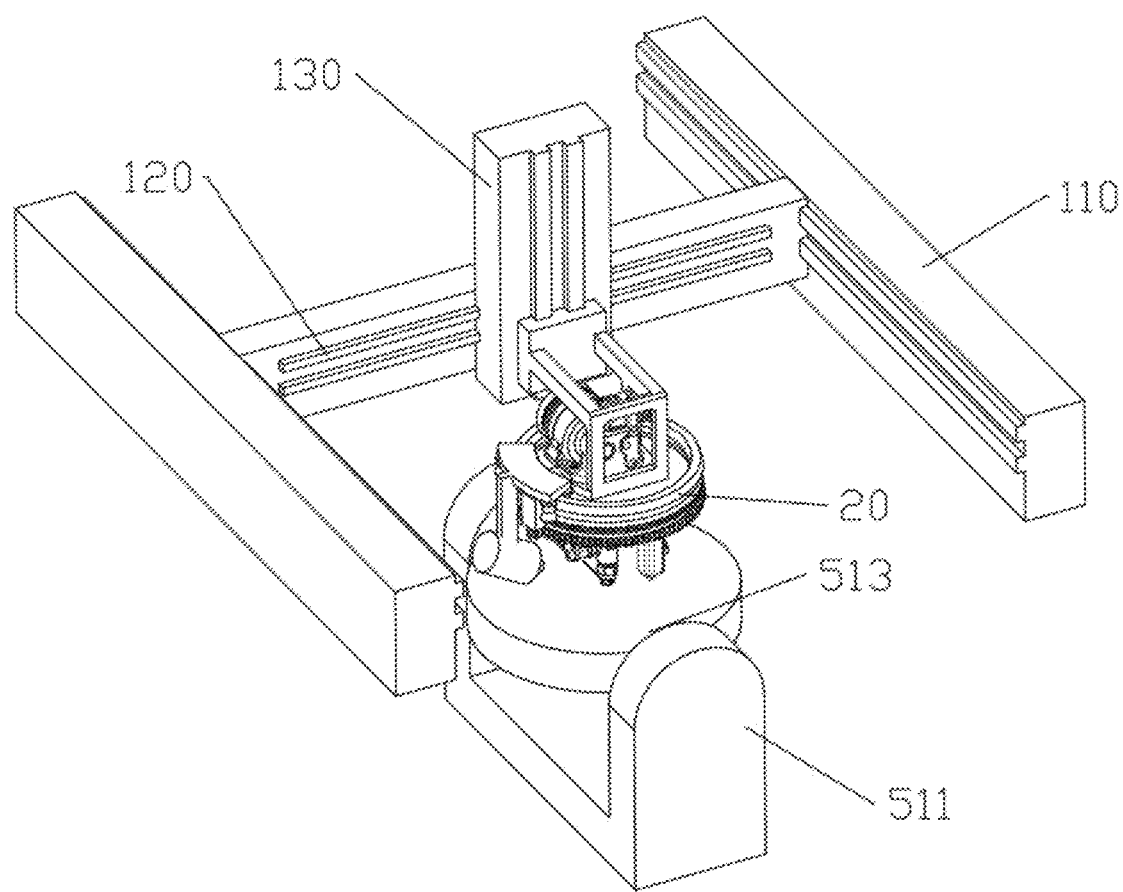
FIG. 11 illustrates a schematic structural diagram of a five-axis multi-axis driving device with rotation around an x-axis and a z-axis of the extrusion device for enhancing the bonding strength between the 3D printing layers according to the embodiment of the present disclosure.
Figure 12:
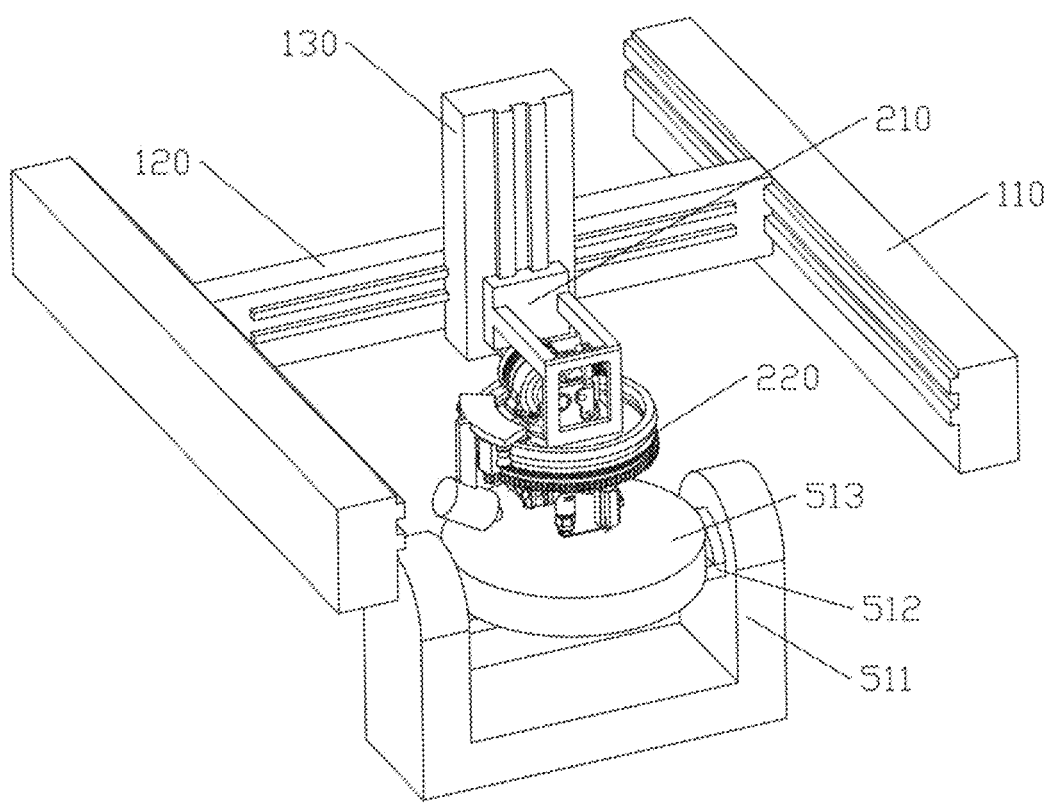
FIG. 12 illustrates a schematic structural diagram of a five-axis multi-axis driving device with rotation around a y-axis and a z-axis of the extrusion device for enhancing the bonding strength between the 3D printing layers according to the embodiment of the present disclosure.

For a common five-axis system, there are three types of rotational combinations, including a five-axis multi-axis driving device with rotation around an x-axis and a y-axis, a five-axis multi-axis driving device with rotation around an x-axis and a z-axis, and a five-axis multi-axis driving device with rotation around a y-axis and a z-axis. These three types of devices can respectively achieve rotation around the x-axis followed by rotation around the y-axis, rotation around the x-axis followed by rotation around the z-axis, and rotation around the y-axis followed by rotation around the z-axis, as shown in FIG. 10, FIG. 11, and FIG. 12. It should be noted that the mechanical structure only needs to satisfy directions of the rotation axes being consistent with the coordinate system, and the rotational mechanical structure can be located at any position.

The rotation matrix of the extruder head coordinate system $O_t$ relative to the workpiece coordinate system O is defined as R, and an inverse transformation matrix of the rotation matrix R is $R^{-1}$. An original z-axis normal vector of the extruder head coordinate system $O_t$ in the workpiece coordinate system is [0,0,1], and after rotating by the rotation matrix R, the z-axis normal vector of the extruder head coordinate system $O_t$ becomes [$n_x$, $n_y$, $n_z$].

For the case of rotating around the x-axis first and then around the y-axis, the combination of rotating around the x-axis first and then around the y-axis is required. The extruder head first rotates around the x-axis of the workpiece coordinate system by an angle $\alpha$, and then rotates around the y-axis of the workpiece coordinate system by an angle $\beta$. The corresponding rotation matrix is denoted as:

$$R = R_Y(\beta) \cdot R_X(\alpha)$$

$$R = R_Y(\beta) \cdot R_X(\alpha) = \begin{bmatrix} \cos\beta & \sin\beta\sin\alpha & \sin\beta\cos\alpha \\ 0 & \cos\alpha & -\sin\alpha \\ -\sin\beta & \cos\beta\sin\alpha & \cos\beta\cos\alpha \end{bmatrix}.$$

The inverse transformation matrix $R^{-1}$ of the rotation matrix R is denoted as:

$$R^{-1} = R_X(-\alpha) R_Y(-\beta)$$

$$R_X(-\alpha) = \begin{bmatrix} 1 & 0 & 0 \\ 0 & \cos\alpha & \sin\alpha \\ 0 & -\sin\alpha & \cos\alpha \end{bmatrix}, R_Y(-\beta) = \begin{bmatrix} \cos\beta & 0 & -\sin\beta \\ 0 & 1 & 0 \\ \sin\beta & 0 & \cos\beta \end{bmatrix}$$

$$R^{-1} = \begin{bmatrix} \cos\beta & 0 & -\sin\beta \\ \sin\alpha\sin\beta & \cos\alpha & \sin\alpha\cos\beta \\ \cos\alpha\sin\beta & -\sin\alpha & \cos\alpha\cos\beta \end{bmatrix}$$

The original z-axis normal vector of the extruder head coordinate system $O_t$ in the workpiece coordinate system is [0,0,1], and after rotating by the rotation matrix R, the z-axis normal vector of the extruder head coordinate system $O_t$ becomes [$n_x$, $n_y$, $n_z$].

Based on the inverse transformation matrix $R^{-1}$, rotation angles can be calculated as follows:

$$\begin{cases} \sin\beta\cos\alpha = n_x \\ -\sin\alpha = n_y \\ \cos\beta\cos\alpha = n_z \end{cases}$$

$$\alpha = -\arcsin(n_y)$$

$$\beta = \arctan2(n_x, n_z).$$

For the case of rotating around the x-axis first and then around the z-axis, the extruder head first rotates around the x-axis of the workpiece coordinate system by an angle $\alpha$, and then rotates around the z-axis of the workpiece coordinate system by an angle $\gamma$. The corresponding rotation matrix is denoted as:

$$R = R_Z(\gamma) \cdot R_X(\alpha)$$

$$R = R_Z(\gamma) \cdot R_X(\alpha) = \begin{bmatrix} \cos\gamma & -\sin\gamma\cos\alpha & \sin\gamma\sin\alpha \\ \sin\gamma & \cos\gamma\cos\alpha & -\cos\gamma\sin\alpha \\ 0 & \sin\alpha & \cos\alpha \end{bmatrix}$$

The inverse transformation matrix $R^{-1}$ of the rotation matrix R is denoted as:

$$R^{-1} = R_X(-\alpha) R_Z(-\gamma)$$

$$R_X(-\alpha) = \begin{bmatrix} 1 & 0 & 0 \\ 0 & \cos\alpha & \sin\alpha \\ 0 & -\sin\alpha & \cos\alpha \end{bmatrix}, R_Z(-\gamma) = \begin{bmatrix} \cos\gamma & \sin\gamma & 0 \\ -\sin\gamma & \cos\gamma & 0 \\ 0 & 0 & 1 \end{bmatrix}$$

$$R^{-1} = \begin{bmatrix} \cos\gamma & \sin\gamma & 0 \\ -\cos\alpha\sin\gamma & \cos\alpha\cos\gamma & \sin\alpha \\ \sin\alpha\sin\gamma & -\sin\alpha\cos\gamma & \cos\alpha \end{bmatrix}$$

The original z-axis normal vector of the extruder head coordinate system $O_t$ in the workpiece coordinate system is [0,0,1], and after rotating by the rotation matrix R, the z-axis normal vector of the extruder head coordinate system $O_t$ becomes $[n_x, n_y, n_z]$.

Based on the inverse transformation matrix $R^{-1}$, rotation angles can be calculated as follows:

$$\begin{cases} \sin\gamma\sin\alpha = n_x \\ -\cos\gamma\sin\alpha = n_y \\ \cos\alpha = n_z \end{cases}$$

$$\alpha = \arccos(n_z)$$

$$\gamma = \arctan2(n_x, -n_y).$$

For the case of rotating around the y-axis first and then around the z-axis, the extruder head first rotates around the y-axis of the workpiece coordinate system by an angle $\beta$, and then rotates around the z-axis of the workpiece coordinate system by an angle $\gamma$. The corresponding rotation matrix is denoted as:

$$R = R_Z(\gamma) \cdot R_Y(\beta)$$

$$R = R_Z(\gamma) \cdot R_Y(\beta) = \begin{bmatrix} \cos\beta\cos\gamma & -\cos\beta\sin\gamma & \sin\beta \\ \sin\gamma & \cos\gamma & 0 \\ -\sin\beta\cos\gamma & \sin\beta\sin\gamma & \cos\beta \end{bmatrix}$$

The inverse transformation matrix $R^{-1}$ of the rotation matrix R is denoted as:

$$R^{-1} = R_Y(-\beta)R_Z(-\gamma)$$

$$R_Y(-\beta) = \begin{bmatrix} \cos\beta & 0 & \sin\beta \\ 0 & 1 & 0 \\ -\sin\beta & 0 & \cos\beta \end{bmatrix}, R_Z(-\gamma) = \begin{bmatrix} \cos\gamma & \sin\gamma & 0 \\ -\sin\gamma & \cos\gamma & 0 \\ 0 & 0 & 1 \end{bmatrix}$$

$$R^{-1} = \begin{bmatrix} \cos\beta\cos\gamma & \cos\beta\sin\gamma & -\sin\beta \\ -\sin\gamma & \cos\gamma & 0 \\ \sin\beta\cos\gamma & \sin\beta\sin\gamma & \cos\beta \end{bmatrix}$$

The original z-axis normal vector of the extruder head coordinate system $O_t$ in the workpiece coordinate system is [0,0,1], and after rotating by the rotation matrix R, the z-axis normal vector of the extruder head coordinate system $O_t$ becomes $[n_x, n_y, n_z]$.

Based on the inverse transformation matrix $R^{-1}$, rotation angles can be calculated as follows:

$$\begin{cases} \sin\beta\cos\gamma = n_x \\ \sin\beta\sin\gamma = n_y \\ \cos\beta = n_z \end{cases}$$

$$\beta = \arccos(n_z)$$

$$\gamma = \arctan2(n_y, n_x).$$

Therefore, formulas for calculating rotation angles are as follows:

For the case of rotating around the x-axis first and then around the y-axis, $\alpha = -\arcsin(n_y)$, $\beta = \arctan2(n_x, n_z)$.

For the case of rotating around the x-axis first and then around the z-axis, $\alpha = \arccos(n_z)$, $\gamma = \arctan2(n_x, -n_y)$.

For the case of rotating around the y-axis first and then around the z-axis, $\beta = \arccos(n_z)$, $\gamma = \arctan2(n_y, n_x)$.

Thus, the rotation matrices and the inverse transformation matrices are now fully known.

At a moment $t_j$, a coordinate of a point $P(t_j)$ in the workpiece coordinate system O is as follows:

$$P(t_j) = \begin{pmatrix} x_j \\ y_j \\ z_j \end{pmatrix}.$$

At a moment $t_{j+1}$, a coordinate of a point $P(t_{j+1})$ in the workpiece coordinate system O is as follows:

$$P(t_{j+1}) = \begin{pmatrix} x_{j+1} \\ y_{j+1} \\ z_{j+1} \end{pmatrix}.$$

At the moment $t_j$, an origin of the extruder head coordinate system $O_t$ is $P(t_j)$, and the rotation of the extruder head coordinate system $O_t$ relative to the workpiece coordinate system O is described by the rotation matrix expressed using the previously obtained rotation angles.

Therefore, a coordinate of $P(t_{j+1})$ in the extruder head coordinate system $O_t$ is obtained by first translating to the origin of the extruder head coordinate system $O_t$, and then applying the inverse transformation by using the inverse transformation matrix $R^{-1}$:

$$P'(t_{j+1}) = R^{-1}(P(t_{j+1}) - P(t_j)) = R^{-1}\begin{pmatrix} x_{j+1} - x_j \\ y_{j+1} - y_j \\ z_{j+1} - z_j \end{pmatrix}.$$

Assuming that $\Delta x = x_{j+1} - x_j$, $\Delta y = y_{j+1} - y_j$, $\Delta z = z_{j+1} - z_j$, in the three types of five-axis rotation cases described earlier, the components are expanded as follows.

For the case of rotating around the x-axis first and then around the y-axis, $$\begin{cases} x' = \cos\beta\Delta x - \sin\beta\Delta z \\ y' = \cos\alpha\Delta y + \sin\alpha(\sin\beta\Delta x + \cos\beta\Delta z) \\ z' = -\sin\alpha\Delta y + \cos\alpha(\sin\beta\Delta x + \cos\beta\Delta z) \end{cases}$$

For the case of rotating around the x-axis first and then around the z-axis, $$\begin{cases} x' = \cos\gamma\Delta x + \sin\gamma\Delta y \\ y' = -\cos\alpha\sin\gamma\Delta x + \cos\alpha\cos\gamma\Delta y + \sin\alpha\Delta z \\ z' = \sin\alpha\sin\gamma\Delta x - \sin\alpha\cos\gamma\Delta y + \cos\alpha\Delta z \end{cases}$$

For the case of rotating around the y-axis first and then around the z-axis, $$\begin{cases} x' = \cos\beta\cos\gamma\Delta x + \cos\beta\sin\gamma\Delta y - \sin\beta\Delta z \\ y' = -\sin\gamma\Delta x + \cos\gamma\Delta y \\ z' = \sin\beta\cos\gamma\Delta x + \sin\beta\sin\gamma\Delta y + \cos\beta\Delta z \end{cases}$$

$(x',y',z')^T = P'(t_{j+1})$, $P'(t_{j+1})$ is the coordinate of $P(t_{j+1})$ in the extruder head coordinate system $O_t$.

Thus, at any arbitrary moment $t_j$, a calculation method for the rotation angle $\delta(t_j)$ of the laser emitter 430 within the extruder head coordinate system $O_t$ is as follows:
when x'=0, y'>0, $\delta(t_j)$=90°;
when x'=0, y'<0, $\delta(t_j)$=270°;
when x'>0, y'=0, $\delta(t_j)$=0°;
when x'<0, y'=0, $\delta(t_j)$=180°;
when x'>0, y'>0, $\delta(t_j)$=arctan 2(|y'/x'|) (|| represents taking an absolute value);
when x'<0, y'>0, $\delta(t_j)$=arctan 2(|y'/x'|)+90°;
when x'<0, y'<0, $\delta(t_j)$=arctan 2(|y'/x'|)+180°;
when x'>0, y'<0, $\delta(t_j)$=arctan 2(|y'/x'|)+270°.

For any arbitrary multi-axis path, the rotation angle of the laser at any moment can be calculated in the same manner as described above, and the rotation angle is relative to the extruder head coordinate system $O_t$, which makes it more convenient for control.

If it is a three-axis or two-axis system, then $\alpha$ and $\beta$ are always 0, and the above formula degenerates to:

$$\begin{cases} x' = \Delta x \\ y' = \Delta y \\ z' = \Delta z \end{cases}$$

Consistent with the three-axis control method described earlier, and for a four-axis system, one of $\alpha$, $\beta$, or $\gamma$ is 0.

To address the issue of angle discontinuities of the laser emitter at a connection points $P_i$ between two line segments, the present disclosure proposes a laser angle smoothing algorithm. For any path point $P_i$, a point $K_i$ is sampled at a position on a left side of the path point $P_i$ that is separated from the path point $P_i$ by $d_i$, and a point $L_i$ is sampled at a position on a right side of the path point $P_i$ that is separated from the path point $P_i$ by $f_i$. Here, d and f are user-specified smoothing distance parameters, which are greater than or equal to 0. When d and f are set to 0, no smoothing effect is applied. Additionally, a value of each of $f_i$ and $d_{i+1}$ must be less than a length from $P_i$ to $P_{i+1}$.

For each path segment from $P_i$ to $P_{i+1}$, when the extruder head moves from $L_i$ to $K_{i+1}$, the laser emitter is controlled using the laser rotation angle calculation method described above. For the path segment from $K_i$ to $P_i$, and then to $L_i$, let the rotation angle at $K_i$ be denoted as $\delta_{1,i}$, and let the rotation angle at $L_i$ be denoted as $\delta_{2,i}$, which are calculated by the above method. In each path from $K_i$ to $P_i$, and then to $L_i$, the rotation angles are not calculated using the above-mentioned method but are smoothly transitioned from the $\delta_{1,i}$ to $\delta_{2,i}$. A path parameter t is defined, where a starting point $K_i$ corresponds to t=0, and an ending point $L_i$ corresponds to t=1 t can be a result of normalization of time or a moving distance, and any mature interpolation method can be adopted, such as the following interpolation methods.

1. Linear Interpolation

Linear interpolation between two points is carried out through the scale factor to ensure the uniform change of angle.

$\delta(t) = \delta_{1,i} + (\delta_{2,i} - \delta_{1,i}) \cdot t$ (where $t \in [0,1]$)

A current angle $\delta(t)$ is calculated based on the linear proportion of the parameter t.

2. B-Spline Interpolation

A continuous smooth curve is constructed based on B-spline basis function, and the angle change path is optimized through control points.

Formula (taking cubic B spline as an example):

$$\delta(t) = \sum_{k=0}^{n} N_{k,3}(t) \cdot \delta_k$$

where $\delta_k$ represents a control point (for example, $\delta_{1,i}$ and $\delta_{2,i}$), and $N_{k,3}(t)$ represents a cubic B-spline basis function. Defined as: on the node sequence, the current angle $\delta(t)$ is calculated according to a linear proportion of the parameter t.

3. Cubic Spline Interpolation

For the path parameter $t \in [t_{K_i}, t_{L_i}]$, cubic polynomials are constructed segmentally:

$\delta(t) = a_i(t-t_{K_i})^3 + b_i(t-t_{K_i})^2 + c_i(t-t_{K_i}) + d_i (t \in [t_{K_i}, t_{L_i}])$ Endpoint value matching: $\delta(t_{K_i}) = \delta_{1,i}$, $\delta(t_{L_i}) = \delta_{2,i}$ 4. Bezier Curve Interpolation $\delta(t) = (1-t)^2 \cdot \delta_{1,i} + 2t(1-t) \cdot \delta_{P_i} + t^2 \cdot \delta_{2,i} (t \in [0,1])$ where $\delta_{P_i}$ represents an angular weight of an intermediate control point (which can be set as an average value of $\delta_{1,i}$ and $\delta_{2,i}$ or another optimized value);

5. Sine Easing Interpolation $$\delta(t) = \delta_{1,i} + (\delta_{2,i} - \delta_{1,i}) \cdot \sin^2\left(\frac{\pi t}{2T}\right)(t \in [0, T])$$

where the path parameter t is mapped to a period [0, $\pi/2$].

6. Exponential Smoothing Interpolation

The nonlinear weight is introduced by exponential function to realize the smooth effect of acceleration or deceleration of angle change.

$\delta(t) = \delta_{1,i} + (\delta_{2,i} - \delta_{1,i}) \cdot (1 - e^{-kt})(t \in [0,T])$ where K represents an attenuation coefficient, which is used to controls a transition speed (acceleration is performed when k is greater than 0, and deceleration is performed when k is less than 0), and T represents a total transition time.

7. Piecewise Polynomial Interpolation (e.g., Catmull-Rom Spline)

Local interpolation function is constructed based on adjacent control points (such as $K_i$, $P_i$, $L_i$) to ensure that data points pass strictly and tangent lines are continuous.

$$\delta(t) = \frac{1}{2} \cdot \begin{bmatrix} -t^3 + 2t^2 - t \\ 3t^3 - 5t^2 + 2 \\ -3t^3 + 4t^2 + t \\ t^3 - t^2 \end{bmatrix}^T \cdot \begin{bmatrix} \delta_{2,i-1} \\ \delta_{1,i} \\ \delta_{2,i} \\ \delta_{1,i+1} \end{bmatrix}$$

In an embodiment, a five-axis multi-axis driving device with rotation around the x-axis and y-axis is provided with a dual-axis rotating mechanism on the basis of the x-axis component 110, the y-axis component 120 and the z-axis component 130. The dual-axis rotating mechanism includes a dual-axis sliding seat 511, a y-axis rotary table 512, and an x-axis rotary table 513. The y-axis rotary table 512 has a U-shaped structure. The y-axis rotary table 512 is configured to drive the extrusion unit 20 to rotate integrally along the y-axis under the action of rotating devices disposed at both ends of the dual-axis sliding seat 511. The extrusion unit 20 is fixedly connected with the x-axis rotary table 513. The x-axis rotary table 513 is rotatably connected with the y-axis rotary table 512. The structure here refers to an existing pan-tilt structure in the prior art, which will not be described in detail.

In an embodiment, each of a five-axis multi-axis driving device with rotation around the x-axis and z-axis and a five-axis multi-axis driving device with rotation around the y-axis and z-axis is provided with a pan-tilt mechanism on the basis of the x-axis component 110, the y-axis component 120 and the z-axis component 130. The pan-tilt mechanism is disposed below heated bed 30. Specifically, the pan-tilt mechanism includes a U-shaped rotating seat 521, a transverse rotating table 522 rotatably connected with the U-shaped rotating seat 521, and a longitudinal rotary table 523 rotatably connected with the transverse rotating table 522. The pan-tilt mechanism also refers to the existing pan-tilt structure in the prior art. The difference between the five-axis multi-axis driving device with rotation around the x-axis and z-axis and the five-axis multi-axis driving device with rotation around the y-axis and z-axis lies in the different arrangement directions of the pan-tilt mechanism, so as to realize the difference between the x-axis and the y-axis.

In an embodiment, the base 210 includes a connecting frame 211 and a device plate 212. The connecting frame 211 is a right-angle structure. An end of the connecting frame 211 is connected to the multi-axis driving device 10, the device plate 212 is disposed on an end of the connecting frame 211 facing away from the multi-axis driving device 10, and the extruder 220 is disposed on the device plate 212. The device plate 212 is a circular structure, and the annular guide rail 410 is disposed on a circumferential side of the device plate 212; and the annular guide rail 410 is configured to, when the multi-axis driving device 10 drives the extrusion unit 20 to move, move synchronously with the extrusion unit 20.

In an embodiment, the extruder 220 is provided with an extrusion head 221 and an extrusion head corrector 222 thereon. A body of the extruder 220 passes through the device plate 212, and the extrusion head 221 and the extrusion head corrector 222 are disposed below the device plate 212. The laser emitter 430 is obliquely directed at the previous printing layer and obliquely incident on the previous printing layer, so as to reduce the interference of other structures on the focus in the process of covering the previous printing layer by the new printing layer and affect the heating effect for the previous printing layer. The extrusion head 221 is also provided with a cooling fan thereon, which is configured for cooling the extrusion head 221.

In an embodiment, the sliding seat 420 includes a bearing plate 421 and a connecting rod 423. Guide wheels 422 are disposed on the bearing plate 421, the guide wheels 422 are configured to roll along inner and outer walls of the annular guide rail 410, an end of the connecting rod 423 is connected to the bearing plate 421, and the laser emitter 430 is disposed on an end of the connecting rod 423 facing away from the bearing plate 421. The laser emitter 430 is obliquely disposed at the end of the connecting rod 423 facing away from the bearing plate 421.

In an embodiment, the annular guide rail 410 is provided with roller ring rails 411 and a driven gear 413. The roller ring rails 411 are disposed on the inner and outer walls of the annular guide rail 410. The guide wheels 422 are arranged in arcs and are configured to move along the roller ring rails 411 disposed on the inner and outer walls of the annular guide rail 410. The guide wheels 422 are V-shaped wheels, and the roller ring rails 411 are V-shaped guide rails adapted to the guide wheels 422.

In an embodiment, the driving mechanism 440 includes a driving motor 441 and a driving gear 442 disposed on a power output shaft of the driving motor 441. The driven gear 413 is meshed with the driving gear. The driving gear 442 is configured to rotate to thereby drive the laser emitter 430 to follow the motion trajectory of the extruder 220 and thereby to deflect.

In an embodiment, the main controller uses the data trajectory analysis module to record a movement distance of the multi-axis driving device 10, perceive an angle of the extruder 220, and parse the rotation angle theta of the laser emitter 430. The angle control relies on the action of the driving gear on the driven gear 413. The driving motor can be a high-speed stepper motor or a high-speed variable frequency motor to achieve precise control.

In an embodiment, the connecting rod 423 is provided with a conductive slider 424 thereon, and the conductive slider 424 is configure to slide on a conductive slip ring 412 disposed on the annular guide rail 410. The conductive slip ring 412 and conductive slider 424 are used to supply power to the laser emitter 430 and the driving mechanism 440.

The embodiment of the invention provides an extrusion device for enhancing the bonding strength between 3D printing layers, which can also be applied to a five-axis 3D printing device, where the five-axis includes a multi-axis driving device 10 with a three-axis mechanism and a heated bed 30 composed of two groups of rotating shafts, and the heated bed 30 realizes spherical position transformation through two groups of vertically arranged rotating shafts. The extrusion device for enhancing the bonding strength between the 3D printing layers of the present disclosure can also be applied to a five-axis 3D printing device. The five-axis 3D printing device includes a multi-axis driving device 10 with a three-axis mechanism and a heated bed 30 including two sets of rotating axes. The heated bed 30 achieves spherical position transformation through the two sets of rotating axes vertically arranged.

It should be noted that for the sake of simple description, all the above-mentioned embodiments are expressed as a series of action combinations, but those skilled in the art should know that the present disclosure is not limited by the described action sequence, because some steps may be performed in other sequences or at the same time according to the present disclosure. Secondly, those skilled in the art should also know that the embodiments described in the specification are all preferred embodiments, and the actions and modules involved are not necessarily necessary for the present disclosure.

The above embodiments are only used to illustrate the technical solutions of the present disclosure, and are not intended to limit the scope of protection of the present disclosure. Apparently, the described embodiments are only part of embodiments of the present disclosure, not the whole embodiments. Based on these embodiments, all other embodiments obtained by ordinary people in the field without creative work belong to the scope of protection of the present disclosure. Although the present disclosure has been described in detail with reference to the above-mentioned embodiments, ordinary technicians in the field can still combine, add, delete or make other adjustments to the features in various embodiments of the present disclosure according to the situation without any conflict, so as to obtain different other technical solutions whose essence does not deviate from the concept of the present disclosure, and these technical solutions also belong to the scope to be protected by the present disclosure.

What is claimed is:

1. An extrusion device for enhancing a bonding strength between three-dimensional printing layers, the extrusion device comprising:
a multi-axis driving device and an extrusion unit, wherein the extrusion unit comprises a base and an extruder, the base is disposed on the multi-axis driving device, and the multi-axis driving device is configured to drive the extrusion unit to move, wherein the base comprises a connecting frame and a device plate, the connecting frame is a right-angle structure, an end of the connecting frame is connected to the multi-axis driving device, the device plate is disposed on an end of the connecting frame facing away from the multi-axis driving device, the extruder is disposed on the device plate, an extrusion head is disposed on the extruder, and the extrusion head is disposed below the device plate, wherein the device plate is a circular structure, and the annular guide rail is disposed on a circumferential side of the device plate; and the annular guide rail is configured to, when the multi-axis driving device drives the extrusion unit to move, move synchronously with the extrusion unit;
a laser heating unit, wherein the laser heating unit comprises an annular guide rail, a sliding seat, and a laser emitter; the laser emitter is disposed on the sliding seat, the sliding seat is slidably disposed on the annular guide rail, and the annular guide rail is disposed on a circumferential side of the extruder; and a driving mechanism is disposed on the sliding seat, and the driving mechanism is configured to drive the laser emitter to rotate around the extruder; a main controller disposed on the extruder, a displacement sensor is configured to upload motion trajectory parameters formed by the extruder during 3D printing to the main controller; and a rotation speed controller disposed on the driving mechanism, wherein the main controller is configured to: calculate a rotation angle theta of the laser emitter based on a motion trajectory of the extruder, and the laser emitter is configured to rotate based on the rotation angle theta to thereby make laser emitted by the extruder continuously heat an area to be covered by a material extruded by the extruder.

2. The extrusion device for enhancing the bonding strength between the 3D printing layers as claimed in claim 1, wherein the sliding seat comprises a bearing plate and a connecting rod, guide wheels are disposed on the bearing plate, the guide wheels are configured to roll along inner and outer walls of the annular guide rail, an end of the connecting rod is connected to the bearing plate, and the laser emitter is disposed on an end of the connecting rod facing away from the bearing plate.

3. The extrusion device for enhancing the bonding strength between the 3D printing layers as claimed in claim 2, wherein roller ring rails and a driven gear are disposed on the annular guide rail, the roller ring rails are disposed on the inner and outer walls of the annular guide rail, and the guide wheels are configured to move along the roller ring rails.

4. The extrusion device for enhancing the bonding strength between the 3D printing layers as claimed in claim 3, wherein the driving mechanism comprises a driving motor and a driving gear disposed on a power output shaft of the driving motor, the driven gear is meshed with the driving gear, and the driving gear is configured to rotate to thereby drive the laser emitter to follow the motion trajectory of the extruder and thereby to deflect.

5. The extrusion device for enhancing the bonding strength between the 3D printing layers as claimed in claim 4, wherein a conductive slider is disposed on the connecting rod, and the conductive slider is configured to slide on a conductive slip ring disposed on the annular guide rail.

6. The extrusion device for enhancing the bonding strength between the 3D printing layers as claimed in claim 5, wherein the laser emitter is obliquely disposed at the end of the connecting rod facing away from the bearing plate.

7. The extrusion device for enhancing the bonding strength between the 3D printing layers as claimed in claim 6, wherein the guide wheels are at least four in number; and when the guide wheels are four, the four guide wheels construct two groups of guide wheels, each group of the two groups of guide wheels consists of two guide wheels, and the two groups of guide wheels are respectively disposed on two sides of the annular guide rail, the two groups of guide wheels roll are respectively disposed on the inner and outer walls of the annular guide rail.

8. The extrusion device for enhancing the bonding strength between the 3D printing layers as claimed in claim 7, wherein the guide wheels are V-shaped wheels, the roller ring rails are V-shaped guide rails matched with the guide wheels, and the sliding seat is engaged with the annular guide rail through mutual cooperation of the guide wheels and the roller ring rails.

* * * * *